US005634629A

United States Patent [19]

Blatt

[11] Patent Number: 5,634,629

[45] Date of Patent: Jun. 3, 1997

[54] ROTARY CLAMP HAVING A COMMON PLANE MOUNTING ARRANGEMENT

[75] Inventor: John A. Blatt, Grosse Pointe Shores, Mich.

[73] Assignee: ISI Norgren Inc., Anoka, Minn.

[21] Appl. No.: 362,152

[22] Filed: Dec. 22, 1994

[51] Int. Cl.[6] .............. B23Q 3/08

[52] U.S. Cl. .............. 269/32; 269/229

[58] Field of Search .............. 269/24, 25, 27, 269/32, 93, 94, 228, 229

[56] References Cited

U.S. PATENT DOCUMENTS

| | | | |
|---|---|---|---|
| 3,362,703 | 1/1968 | Blatt . | |
| 3,381,954 | 5/1968 | Blatt . | |
| 3,618,931 | 11/1971 | Blatt . | |
| 4,396,183 | 8/1983 | Lymburner . | |
| 4,500,081 | 2/1985 | Carossino | 269/94 |
| 4,728,137 | 3/1988 | Hamed et al. . | |
| 4,905,973 | 3/1990 | Blatt | 269/32 |
| 5,080,336 | 1/1992 | Carossino . | |
| 5,118,088 | 6/1992 | Sawdon . | |
| 5,171,001 | 12/1992 | Sawdon . | |
| 5,215,295 | 6/1993 | Hoover . | |

OTHER PUBLICATIONS

BTM, Sealed Toggle Clamps (Undated).

*Primary Examiner*—Robert C. Watson
*Assistant Examiner*—Thomas W. Lynch
*Attorney, Agent, or Firm*—Young & Basile, P.C.

[57] ABSTRACT

A rotary clamp having a common plane mounting arrangement that provides a first planar surface for mounting the rotary clamp to a support member and a second planar surface for mounting a workpiece engaging means to the rotary clamp wherein the first and second planar surfaces lie in a common plane for simplifying the set up procedure of the rotary clamp. The first planar surface is formed on a housing of the rotary clamp, and the second planar surface is formed on a pivot pin of the rotary clamp. The first and second planar surfaces are spaced from one another to provide proper relief so that the workpiece engaging means may freely rotate without interference from the second planar surface. The pivot pin provides a large end portion seated within a recess of the housing that remains externally accessible with respect to the housing. A bearing means is provided for rotatably supporting the pivot pin end portion within the recess and for longitudinally supporting the pivot pin end portion against thrust forces along the longitudinal axis of the recess. The enlarged pivot pin end portion and bearing means provide added stability and durability. By being externally accessible with respect to the housing, the bearing means may be inspected and/or replaced without the need for disassembling the rotary clamp.

2 Claims, 3 Drawing Sheets

ROTARY CLAMP HAVING A COMMON PLANE MOUNTING ARRANGEMENT

FIELD OF THE INVENTION

The present invention relates, in general, to clamping devices, and more particularly, to a rotary clamp having a first planar surface for mounting a support member thereto and a second planar surface for mounting a clamp arm thereto wherein the first and second planar surfaces lie in a common plane to simplify the set up procedure for the rotary clamp.

BACKGROUND OF THE INVENTION

Rotary clamps are typically used in industrial applications for engaging workpieces of many sizes and shapes during forming and machining operations. Clamp arms may be utilized to secure a workpiece against a workpiece holder or they may be utilized to prohibit movement in a specific direction such as a positive stop. Such rotary clamps typically provide movement of the clamp arms through a pneumatically or hydraulically actuated cylinder which causes the clamp arms to rotate through a desired position and distance. Depending on the specific application, the user may wish to actuate one arm or two arms. The user may wish to have the clamp arms vertically aligned or horizontally aligned, as well as reversible. In addition, all of these specific applications may be utilized in a harsh environmental setting.

In industrial applications, the rotary clamp may be mounted to a support member wherein the mounting arrangement between the support member and the rotary clamp establishes a geometric reference by which all geometric tolerancing, for that application, is based thereon. Thus, all other datums regarding planes, points, tolerances, etc., are measured from this reference. Therefore, the further a particular datum is from the reference or the more intricate and complex the geometric tolerancing of the datum is from the reference, then the more difficult it is to set up the rotary clamp to perform and maintain an accurate and repeatable process. This is especially true when the support member is coupled to a programmable robot wherein the robot moves the rotary clamp between predetermined points along a three-dimensional coordinate system. Thus, it is desirable to have the support member mount to the rotary clamp on the same plane in which the clamp arm mounts to the rotary clamp in order that both the support member and clamp arm share a common reference plane such that no compensation or adjustment of the clamp arm relative to the support member is required.

It is well known in the art to provide a fully sealed, permanently lubricated rotary clamp suited for use in contaminated environments in order to protect the internal mechanisms of the rotary clamp from weld splatter, saw chips, coolants, dust, dirt, etc. Such rotary clamps often have design drawbacks which prevent the support member and clamp arm from being mounted to the rotary clamp on a common plane. For example, relief must be provided between the clamp arm and the rotary clamp's support member mounting surface so that the clamp arm is free to rotate. Also, such sealed rotary clamps are typically time consuming to service and maintenance as they require the rotary clamp to be completely disassembled in order to obtain access to the internal mechanisms of the rotary clamp.

SUMMARY OF THE INVENTION

The present invention overcomes the above noted short comings by providing a rotary clamp having a common plane mounting arrangement that provides a first planar surface for mounting the rotary clamp to a support member and a second planar surface for mounting a workpiece engaging means to the rotary clamp wherein the first and second planar surfaces lie in a common plane to simplify the set up procedure of the rotary clamp. The first planar surface is formed on a housing of the rotary clamp, and the second planar surface is formed on a pivot pin of the rotary clamp. The first and second planar surfaces are spaced from one another to provide proper relief so that the workpiece engaging means may freely rotate without interference from the second planar surface.

The housing of the rotary clamp is enclosed and bifurcated and has a longitudinal axis extending the length of the housing wherein the bifurcated halves of the housing are substantially similar and symmetrical. The housing has an aperture extending through the housing along an axis transverse of and offset from the longitudinal axis. The housing also provides cylindrical recesses coaxially aligned with the aperture and opening externally with respect to the housing. The pivot pin has a body portion disposed within the housing and opposite ends extending through the aperture and into the recesses of the housing. The pivot pin also has cylindrical end portions, larger than the body portion, that are disposed within the recesses of the housing. A bearing means rotatably supports the end portions of the pivot pin when rotating about the transverse axis. The bearing means also provides support for thrust forces along the transverse axis. The end portions of the pivot pin and the bearing means remain externally accessible with respect to the housing so that the end portions of the pivot pin may be disconnected from the body portion of the pivot pin, and the bearing means may be inspected and/or replaced without having to disassemble the rotary clamp.

A linear motion providing means and a means for converting the linear motion into rotary motion is provided to the pivot pin within the housing. The linear motion providing means provides a linear actuator connected to and received by the housing. The linear actuator utilizes a cylinder connected to the housing with a reciprocal piston slidably disposed within the cylinder. A piston rod has one end connected to the piston and another end connected to a rod end that is slidably received within an elongated guide slot within the housing. Thus, linear motion is imparted to the rod end, and the linear motion is converted into rotary motion through the converting means. The converting means provides a linkage member pivotally connected to the rod end at one end and having another end connected to a lever arm. The lever arm is integral with and extends from the body portion of the pivot pin so that the linkage member transforms linear actuator motion into rotary motion.

Thus, the objects of the present invention are to provide a new and improved rotary clamp that provides a common reference plane for mounting the rotary clamp to a support member and a workpiece engaging means to the rotary clamp to simplify the set up procedure of the rotary clamp; and to provide a new and improved rotary clamp having an enclosed housing wherein a pivot pin end portion and a bearing means are externally excessible with respect to said housing to allow for the servicing of the bearing means without having to disassemble the rotary clamp.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 2:
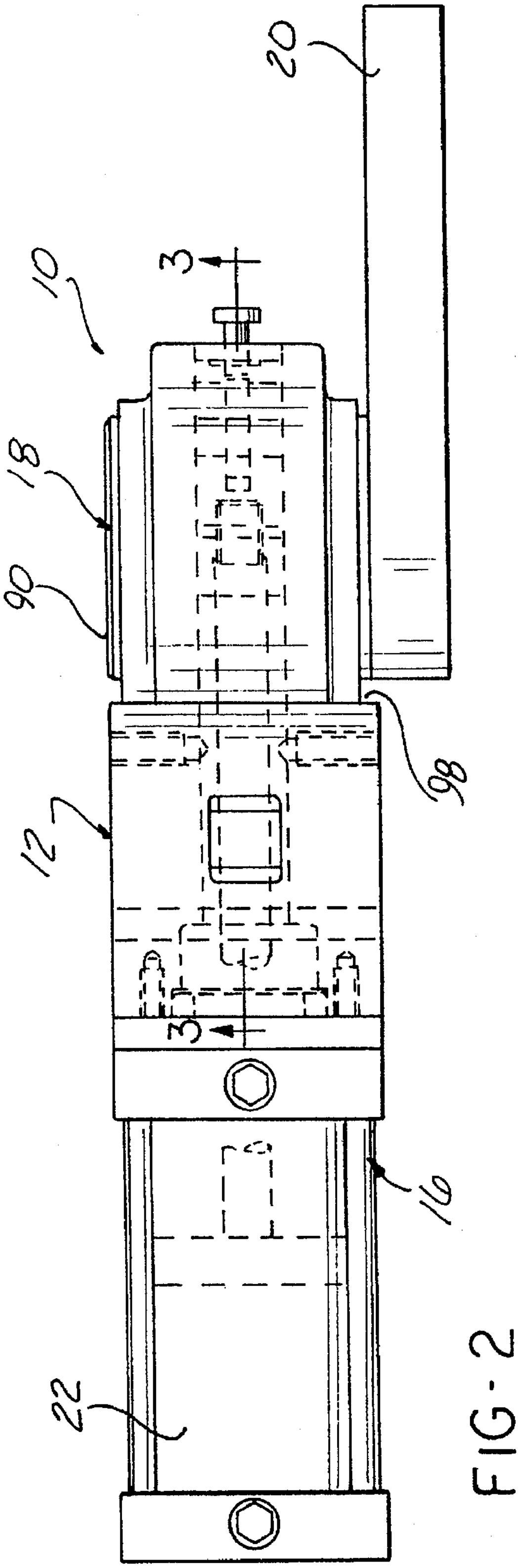
FIG. 2 is a top view showing the second planar surface formed on the end portion of the pivot pin for mounting the clamp arm thereon.
Figure 1:
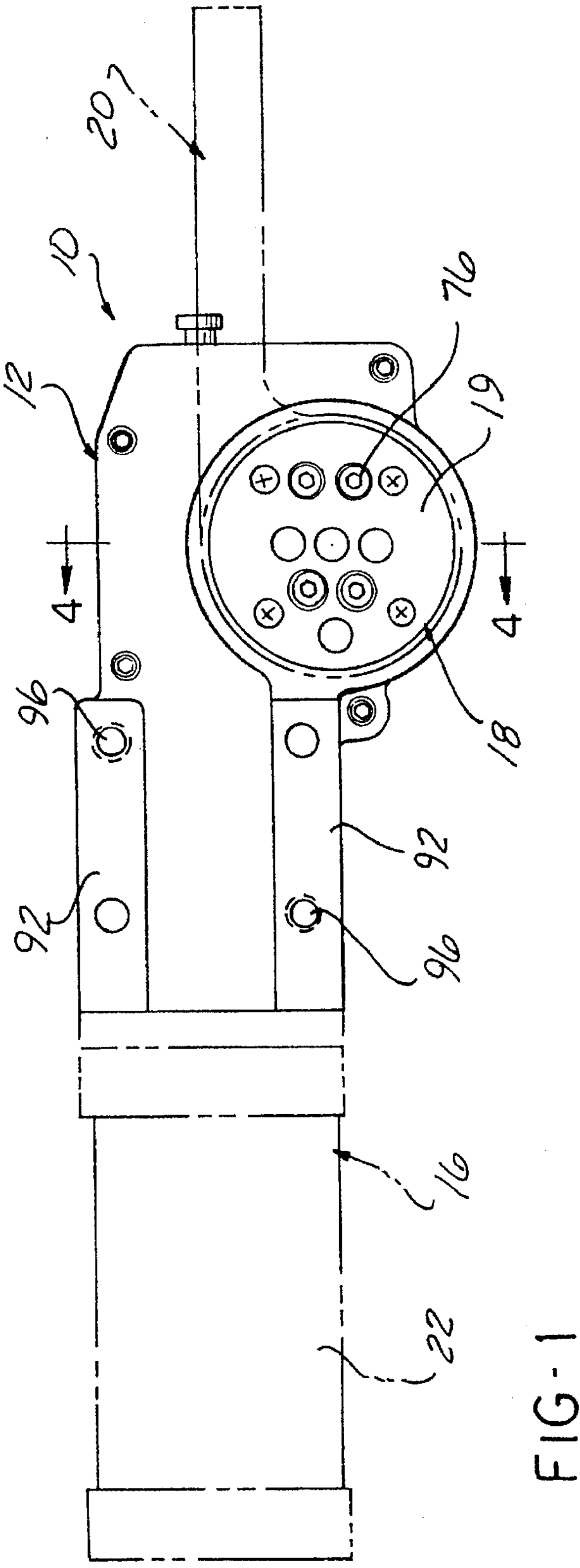
FIG. 1 is a side view of the rotary clamp showing the first planar surface formed on the housing of the rotary clamp for mounting a support member thereon.
Figure 5:
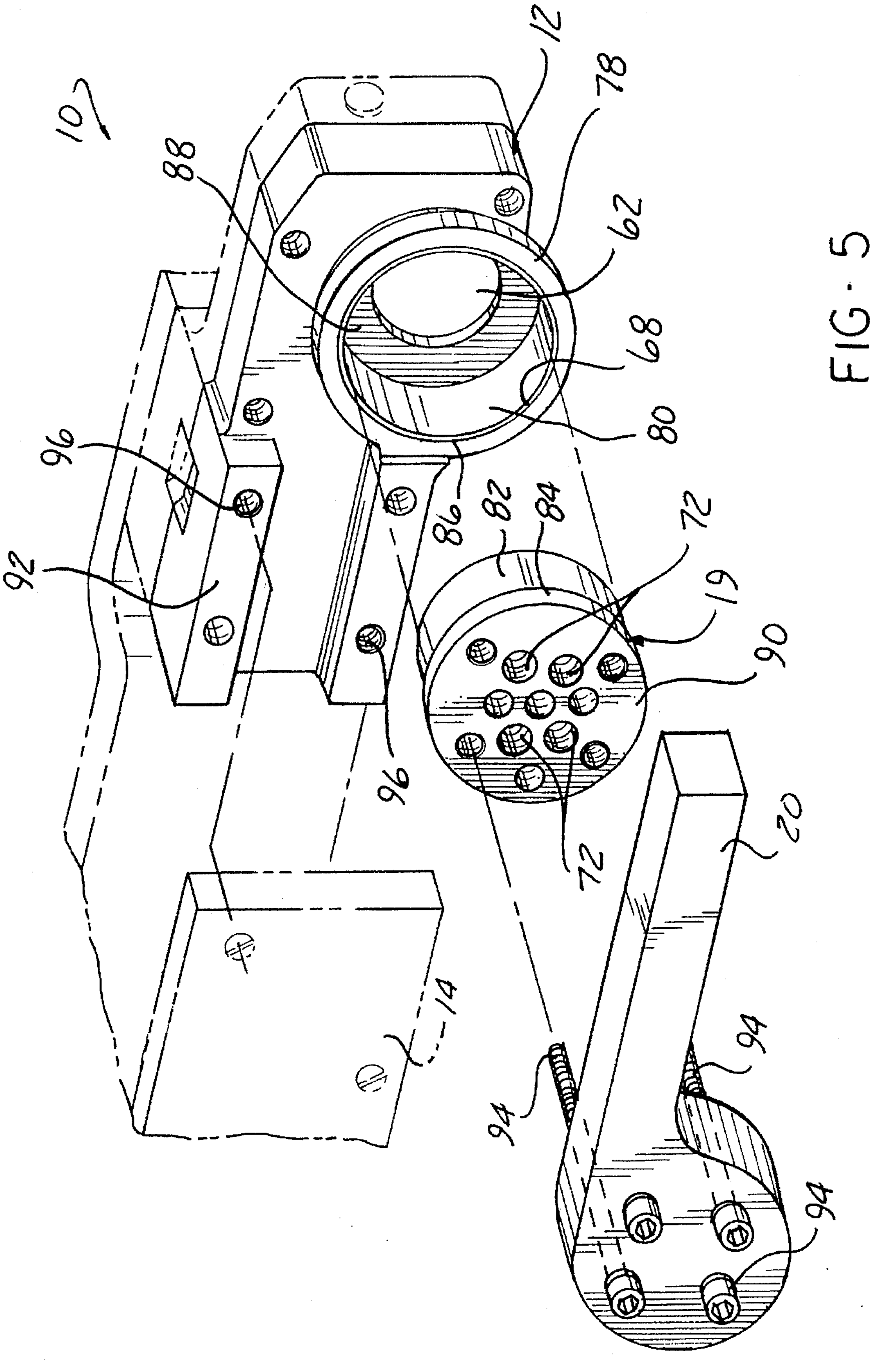
FIG. 5 is an exploded view showing the common plane mounting arrangement of the rotary clamp.

FIG. 5 shows a rotary clamp 10 having a common plane mounting arrangement according to the present invention. The rotary clamp 10 provides a housing 12 that is mounted to a support member 14 which may provide movement to the entire rotary clamp 10. As seen in FIGS. 1 and 2, a linear actuator 16 is connected to the housing 12 and provides a means for providing linear motion to the rotary clamp 10. A means for converting the linear motion to rotary motion is provided within the housing 12 of the rotary clamp 10. Rotary motion is provided to a pivot pin 18 which is disposed within the housing 12. A means for engaging a workpiece (not shown) is mounted to an end portion 19 of the pivot pin 18 wherein the workpiece engaging means may provide a clamp arm 20 for securing a workpiece against a workpiece holder (not shown). It should be noted that the present invention is not limited to one clamp arm 20 mounted to the rotary clamp 10, but rather, a clamp arm 20 may be mounted on each side of the rotary clamp 10 for simultaneous clamping by the two clamp arms 20.

In order to provide linear motion to the internal mechanism of the rotary clamp 10, the linear actuator 16 provides a cylinder 22 attached to an end of the housing 12. The cylinder 22 has a reciprocal piston (not shown) slidably disposed therein. A piston rod 24 is attached to the piston and extends outward from the fluid cylinder 22. The cylinder 22 may have respective opposite rear and front fluid inlets (not shown) which, as is known in the art, are suitably connected by conduits (not shown) to a source of fluid (not shown) under pressure. The cylinder 22 may be hydraulic, pneumatic or conversely, a mechanical reciprocating device which may be used to actuate the linear actuator 16 by reciprocation of the piston rod 24.

Figure 3:
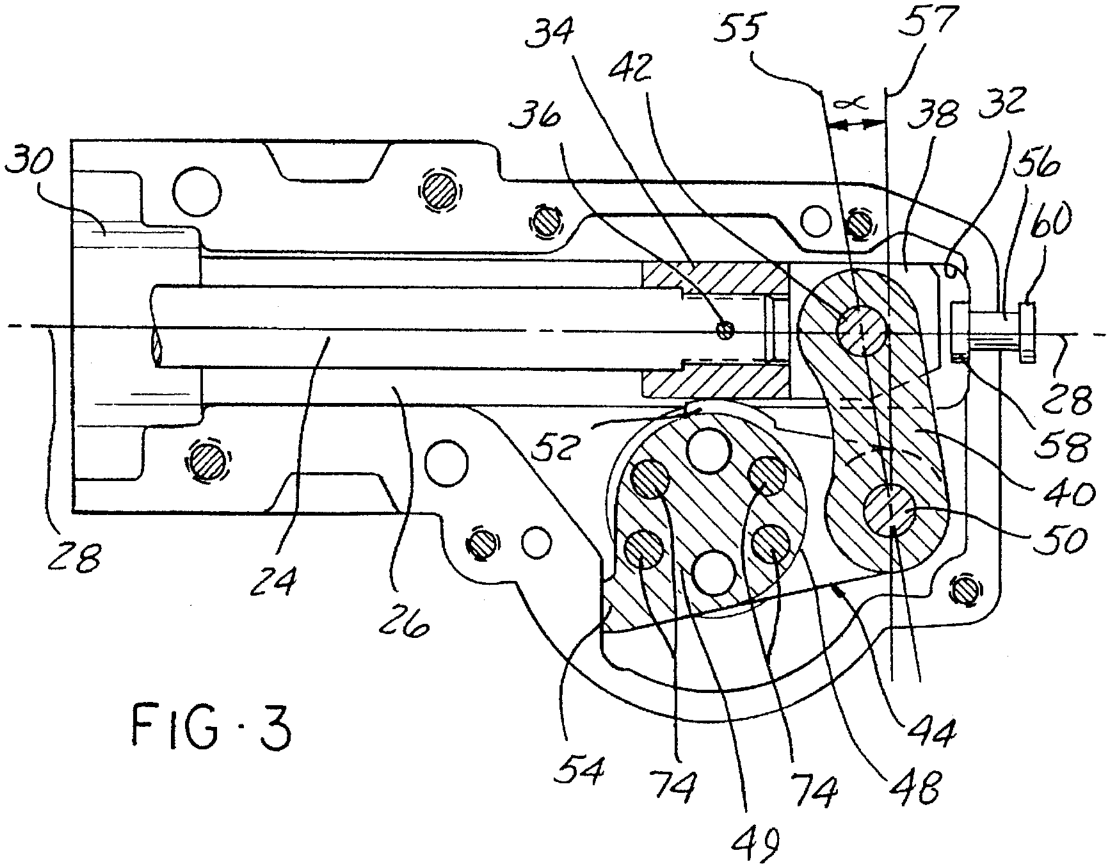
FIG. 3 is a sectional view taken in the direction of arrows 3—3 in FIG. 2 showing the internal mechanisms of the rotary clamp and showing the means for providing rotary motion to the pivot pin.
Figure 4:
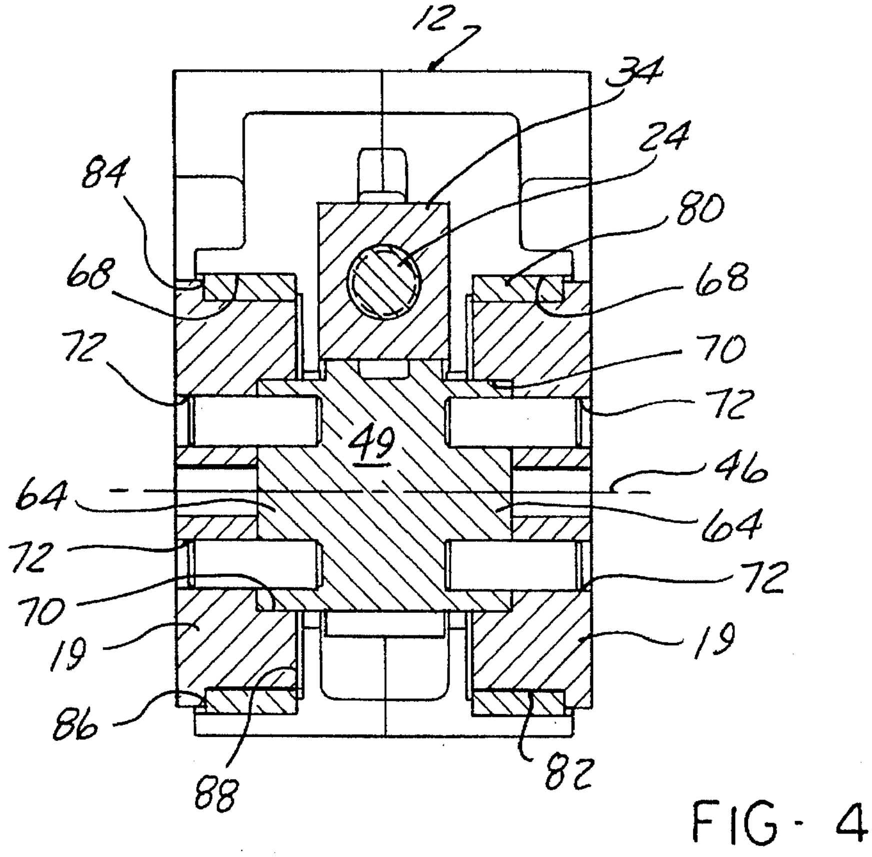
FIG. 4 is a section view taken in the direction of arrows 4—4 in FIG. 1 showing the pivot pin and the common plane mounting arrangement of the first and second planar surfaces.

As seen in FIGS. 4 and 5, the housing 12 of the rotary clamp 10 is bifurcated and enclosed wherein each half of the housing 12 is substantially similar and substantially symmetrical. It should be noted that the present invention is not limited to a bifurcated housing, but rather, the housing could be a one piece enclosure having the same characteristics as will be described below. The housing 12 houses a means for converting the linear actuator motion into angular rotary motion. As best seen in FIG. 3, the housing 12 has an elongated internal guide slot 26 having a longitudinal axis 28 with one end 30 of the guide slot 26 open adjacent the cylinder 22 to receive the free end of the piston rod 24. The other end 32 of the guide slot 26 is closed by the internal surfaces of the housing 12.

To couple the linear actuator 16 with the converting means, a rod end 34 is connected to the free end of the piston rod 24 for providing reciprocal linear movement. The rod end 34 is slidingly guided within the guide slot 26 of the housing 12 and generally has a rectangular cross section with slightly beveled edges and a threaded aperture disposed within one end of the rod end 34 for threadingly engaging the free end of the piston rod 24. A lock pin 36 is provided through an aperture (not shown) in the rod end 34 and extends into the threaded aperture for engaging the piston rod 24 and preventing disengagement of the piston rod 24 from the rod end 34. The opposite end of the rod end 34 includes a slot (not shown) defined by two opposing protruding portions 38 (only one shown) of the rod end 34. A pair of coaxial apertures (not shown), having a common axis, are formed in the two opposed protruding portions 38 of the rod end 34.

In order to convert the linear actuator motion to rotary clamp motion, a linkage member 40 is slidably disposed within the slot of the rod end 34 and extends outwardly therefrom. The linkage member 40 is pivotally connected to the rod end 34 through a pin 42 which passes through an aperture (not shown) provided in the linkage member 40 and through the pair of coaxial apertures extending through the rod end 34. An aperture (not shown) is also provided at the opposite end of the linkage member 40 for pivotally connecting a lever arm 44 to the linkage member 40.

Angular rotary motion is imparted to the pivot pin 18 via the lever arm 44 for angular movement about an axis 46 transverse and offset from the longitudinal axis 28 of the guide slot 26. The lever arm 44 is formed by two opposed substantially parallel members 48 (only one shown) extending from a body portion 49 of the pivot pin 18. A pair of coaxial apertures (not shown), having a common axis, are formed in the two opposed members 48 of the lever arm 44. One end of the linkage member 40 is slidably received between the two opposed members 48 of the lever arm 44, and a pin 50 is inserted through the apertures in the lever arm 44 and through the aperture in the linkage member 40. The pivot pin body portion 49 provides a pair of integral guide lobes 52 that extend radially outward to support and counteract linkage forces on the rod end 34 that are substantially perpendicular to the longitudinal axis 38 of the guide slot 26 toward the pivot pin 18. The guide lobes 52 eliminate the difficult task of forming side walls in the internal walls of the housing 12 for supporting the rod end 34 against forces from the linkage member 40. A combination of the rod end 34, linkage member 40, lever arm 44 and pivot pin 18 provide means for converting linear reciprocal motion into angular rotary clamp motion.

The positioning of the clamp arm 20 in the clamped position may be accurately maintained by a primary stop 54 integral with and extending from the body portion 49 of the pivot pin 18. The linear actuator 16 drives the pivot pin 18 so that the primary stop 54 engages an internal wall of the housing 12 and provides a repeatable and consistent clamping position of the clamp arm 20. By having the primary stop 54 on the pivot pin 18, the accumulation of tolerances is eliminated as the linear actuator 16 will expand its travel to eliminate any looseness within the linkage mechanism.

The primary stop 54 also helps to restrain the over-travel of the linkage member 40 to an over-center position, wherein the pin 36 connecting the linkage member 40 to the rod end 34 is at a 0° angle with respect to the pin 50 connecting the linkage member 40 to the lever arm 44 or, in other words, wherein the linkage angle $\alpha$ formed by the longitudinal axis 55 of the linkage member 40 and an axis 57 perpendicular to the longitudinal axis 28 of the guide slot 26 is at 0° . Limiting the travel of the linkage member 40 also prevents excessive wear in the internal linkage mechanism which occurs when the linkage member 40 passes through the ultra high force region immediately adjacent the 0° angle.

To ensure the linkage member 40 never reaches the over-center position, a reciprocal member 56 is captively mounted within a wall of the housing 12 wherein the reciprocal member 56 has a spool configuration. The reciprocal member 56 is slidably disposed within the wall of the housing 12 such that one end 58 of the reciprocal member 56 comes into engagement with the rod end 34 and the other end 60 remains outside the housing 12. The rod end 34 engages and displaces the reciprocal member 56 every clamping cycle, and when the rod end 34 forces the reciprocal member 56 to abut the inside wall of the housing 12, then the reciprocal member 56 acts as a secondary stop for preventing the linkage member 40 from reaching the over-center position. The reciprocal member 56 may also be utilized to manually reset the rod end 34 toward the unclamped position should the system "shut down" due to loss of power. The end 60 of the reciprocal member 56 outside the housing 12 may be struck with a force so as to manually move the linkage member 40 toward a greater linkage angle α thus reducing the linkage force to a level wherein the rotary clamp 10 can be manually released.

To provide angular rotary support to the pivot pin 18, the housing 12 provides a pair of apertures 62 extending therethrough wherein the apertures 62 extend along the transverse axis 46, as best seen in FIGS. 4 and 5. The pivot pin body portion 49 has opposite ends 64 extending through the coaxial apertures 62 in the housing 12. The end portions 19 of the pivot pin 18 are rotatably secured by a pair of cylindrical recesses 68 provided in the housing 12 that are coaxially aligned with the transverse axis 46 of the apertures 62 and which open to the external portions of the housing 12 so that the recesses 68 remain externally excessible with respect to the housing 12. The pivot pin body portion 49 has opposite ends 64 extending into the recesses 68 of the housing 12, and the pivot pin end portions 19 each provide a recess 70 for slidably engaging the ends 64 of the pivot pin body portion 49. Each pivot pin end portion 19 provides four non-threaded apertures 72 extending therethrough which correspondingly align with four threaded apertures 74 provided in the pivot pin body portion 49. Four conventional fasteners 94 extend through the apertures 72 of the pivot pin end portions 19 to threadingly engage the apertures 74 of the pivot pin body portion 49 in order to secure the pivot pin end portions 19 to the pivot pin body portion 49.

The pivot pin end portions 19 are rotatably and longitudinally supported about and along, respectfully, the transverse axis 46 by a bearing means provided between the pivot pin end portion 19 and the walls 78 of the housing 12 that define the recess 68. The bearing means is a sacrificial bearing 80 fabricated from either a composite material, such as a conventional plastic, or a soft, metallic material such as bronze, wherein the bearing material is softer and less wear resistant than a bearing surface 82, such as steel, provided on the outside diameter of the pivot pin end portion 19. The bearing 80 is press fitted onto the inside diameter of the recess 68, and the pivot pin end portion 19 is slidably received by the bearing 80 so that the bearing 80 may rotatably support the pivot pin end portion 19 about the transverse axis 46. The enlarged bearing surface 82 provided by the pivot pin end portion 19 provides added stability to the rotational movement of the pivot pin 18 as well as reducing the amount of wear to the bearing 80 due to the bearing 80 having a larger surface area.

The pivot pin end portion 19 also has a flange 84 integral with and extending radially outward from the bearing surface or outside diameter 82 of the pivot pin end portion 19. The flange 84 of the pivot pin end portion 19 abuts an end surface 86 of the corresponding bearing 80 to support the pivot pin end portion 19 from thrust forces along the transverse axis 46. The pivot pin end portion 19 is seated within the recess 68 and along the transverse axis 46 such that the bottom of the pivot pin end portion 19 does not contact the portion of the housing 12 that defines the floor or bottom wall 88 of the recess 68. This helps to reduce the level of friction against the rotating pivot pin end portion 66 as well as provide sufficient clearance to ensure the proper seating height of the pivot pin end portion 19, the importance which will be described below.

As seen in FIGS. 1–2 and 4–5, the pivot pin end portion 19 has a top surface 90 that defines a second planar surface. The top surface 90 of the pivot pin end portion 19 is substantially flat and substantially perpendicular to the transverse axis 46 as well as the top surface or second planar surface 90 lying in a common plane with a first planar surface 92. The clamp arm 20 has a substantially flat side surface that abuts to the top surface 90 of the pivot pin end portion 19 wherein four fasteners 94 extend through the clamp arm 20 and thread into four corresponding threaded apertures provided in the pivot pin end portion 19. The first and second planar surfaces 92, 90 are spaced from one another by a relief 98 provided in the contour of the housing 12. Thus, the clamp arm 20 is free to rotate without rubbing or interfering with the housing 12.

In setting up and operating the rotary clamp 10, the rotary clamp 10 is mounted to the support member 14 through apertures 96 provide in the first planar surface 92 formed on the housing 12 of the rotary clamp 10. The support member 14 may be an extension of a robotic arm device (not shown) in order to provide programmable movement of the entire rotary clamp 10. The first planar surface 92 typically becomes a reference plane in which all other geometric tolerancing will be measured therefrom. The clamp arm 20 is connected to the second planar surface or top surface 90 of the pivot pin end portion 19. Since the second planar surface 90 lies in a common plane with the first planar surface 92, the second planar surface 90 is also part of the reference plane, and thus, no compensation for geometric tolerancing need be made for any difference in references between the first planar surface 92 and the second planar surface 90. In order to reduce even more variation between the reference plane and any other datums, the support member 14 may be the same width as the clamp arm 20. Thus, the clamp arm 20 becomes an extension of the support member 14 in the same reference plane.

Serviceability of the bearing 80 and the pivot pin end portion 19 is simple and efficient as the pivot pin end portion 19 remains externally accessible with respect to the housing 12. By simply unthreading the fasteners that connect the pivot pin end portion 19 to the pivot pin body portion 49, the pivot pin end portion 19 may be removed so that the sacrificial bearing 80 may be examined for wear. If the sacrificial bearing 80 is excessively worn, the bearing 80 may be removed and replaced without having to disassemble the entire rotary clamp 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary clamp supported by a supporting member and having a common plane mounting arrangement comprising:

a housing having a first planar surface for mounting said supporting member thereto;

a pivot pin having a second planar surface separate from said first planar surface and lying in the same plane as said first planar surface;

means, disposed within said housing, for providing rotary motion to said pivot pin wherein said rotary motion providing means comprises:

means for providing linear motion; and means for converting linear motion from said linear motion providing means into rotary motion of said pivot pin;

means for engaging a work piece wherein said work piece engaging means is mounted to said second planar surface of said pivot pin for simplifying the set up procedure of said rotary clamp; and cam means, formed on said pivot pin, for engaging and supporting said linear motion providing means.

2. A rotary clamp supported by a supporting member having a common plane mounting arrangement comprising:

a housing having a longitudinal axis and an aperture extending through said housing along a transverse axis transverse to and offset from said longitudinal axis and having a cylindrical recess coaxially aligned with said aperture and externally accessible with respect to said housing;

a pivot pin exposed within said housing and having a body portion extending through said aperture and into said recess of said housing;

means, disposed within said housing, for providing rotational movement to said pivot pin and said rotational movement providing means comprising:

means for providing linear motion; and means for converting linear motion from said linear motion providing means into rotary motion of said pivot pin;

a bearing disposed along the inside diameter of said recess of said housing;

said pivot pin having a larger end portion coupled to said body portion of said pivot pin and disposed concentrically within said bearing and said recess of said housing, and said end portion of said pivot pin having a cylindrical bearing surface for rotational engagement with said bearing, and a flange integral with and extending radially from said end portion of said pivot pin wherein said flange abuts the top surface of the bearing to support said end portion of said pivot pin from thrust forces along said transverse axis, and said larger end portion of said pivot pin remaining externally accessible with respect to said housing;

a clamp arm connected to said end portion of said pivot pin; and at least one cam surface integrally formed on said body portion of said pivot pin for engaging and supporting said linear motion providing means against linkage forces applied to said linear motion providing means.

* * * * *